United States Patent
Maris et al.

(10) Patent No.: US 11,692,048 B2
(45) Date of Patent: Jul. 4, 2023

(54) FUSIBLE OIL GEL COMPOSITIONS AND METHODS OF MAKING AND USING SAME

(71) Applicant: KRATON POLYMERS U.S. LLC, Houston, TX (US)

(72) Inventors: Catherine A. L. Maris, Mont S. Guibert (BE); Erin B. Murphy, Houston, TX (US); Robert C. Bening, Houston, TX (US); Xiangyun Wei, Houston, TX (US); Xavier D. Muyldermans, Mont S. Guibert (BE)

(73) Assignee: KRATON CORPORATION, Houston, TX (US)

( * ) Notice: Subject to any disclaimer, the term of this patent is extended or adjusted under 35 U.S.C. 154(b) by 300 days.

(21) Appl. No.: 16/948,224

(22) Filed: Sep. 9, 2020

(65) Prior Publication Data
US 2020/0399408 A1  Dec. 24, 2020

Related U.S. Application Data

(63) Continuation-in-part of application No. 15/916,392, filed on Mar. 9, 2018, now abandoned.

(60) Provisional application No. 62/469,858, filed on Mar. 10, 2017.

(51) Int. Cl.
| | |
|---|---|
| C08F 212/08 | (2006.01) |
| C08J 3/075 | (2006.01) |
| C08F 299/00 | (2006.01) |
| C08K 5/00 | (2006.01) |
| C08K 5/10 | (2006.01) |
| C08F 2/48 | (2006.01) |

(52) U.S. Cl.
CPC .............. *C08F 212/08* (2013.01); *C08F 2/48* (2013.01); *C08F 299/00* (2013.01); *C08J 3/075* (2013.01); *C08K 5/005* (2013.01); *C08K 5/10* (2013.01)

(58) Field of Classification Search
None
See application file for complete search history.

(56) References Cited

U.S. PATENT DOCUMENTS

| | | |
|---|---|---|
| RE27,145 E | 6/1971 | Jones |
| 3,595,942 A | 7/1971 | Wald |
| 3,634,549 A | 1/1972 | Shaw |
| 3,670,054 A | 6/1972 | De La Mare |
| 3,700,633 A | 10/1972 | Wald |

(Continued)

FOREIGN PATENT DOCUMENTS

| | | |
|---|---|---|
| CN | 1091752 A | 9/1994 |
| CN | 1274374 A | 11/2000 |

(Continued)

*Primary Examiner* — Tae H Yoon

(57) ABSTRACT

A gel composition is herein disclosed. According to one embodiment, the composition comprises a (i) a styrenic block copolymer, (ii) an oil; and (iii) optional additives; wherein the styrenic block copolymer has a structure ABi or iAB, wherein A is a monoalkenyl arene block, B is a conjugated diene block, and i is an isoprene attachment. The isoprene attachment i is substantially unsaturated and the conjugated diene block B is substantially saturated. The gel composition before curing exhibits thixotropic behavior, with a viscosity ranging from about 5000 mPa·s to about 30000 mPa·s. at 25° C. and a shear rate of 20 s$^{-1}$.

20 Claims, 2 Drawing Sheets

(56) References Cited

U.S. PATENT DOCUMENTS

| | | | |
|---|---|---|---|
| 4,242,471 A * | 12/1980 | Lal | C08F 8/48 |
| | | | 525/332.8 |
| 4,963,698 A * | 10/1990 | Chang | H02G 15/04 |
| | | | 174/74 A |
| 5,242,986 A | 9/1993 | Gibler et al. | |
| 5,486,574 A | 1/1996 | Himes et al. | |
| 6,881,776 B2 | 4/2005 | Butuc | |
| 7,960,461 B2 * | 6/2011 | Lin | A61Q 19/00 |
| | | | 514/558 |
| 7,994,256 B2 | 8/2011 | St. Clair | |
| 9,304,231 B2 | 4/2016 | Salazar | |
| 10,723,930 B2 * | 7/2020 | Hill, Jr. | A01N 25/10 |
| 2005/0215725 A1 | 9/2005 | St. Clair | |
| 2007/0215271 A1 * | 9/2007 | McClintic | E04G 23/0203 |
| | | | 156/289 |

FOREIGN PATENT DOCUMENTS

| | | |
|---|---|---|
| EP | 0653449 A1 | 5/1995 |
| EP | 0677065 A1 | 10/1995 |
| EP | 1732983 A1 | 12/2006 |
| WO | 2012112163 A1 | 8/2012 |
| WO | 2015119811 A1 | 8/2015 |

* cited by examiner

FUSIBLE OIL GEL COMPOSITIONS AND METHODS OF MAKING AND USING SAME

RELATED APPLICATIONS

This application is a continuation-in-part of U.S. patent application Ser. No. 15/916,392, with a filing date of Mar. 9, 2018, now abandoned, which claims priority from U.S. Provisional Application No. 62/469,858, with filing date of Mar. 10, 2017, the entire disclosures of which are incorporated herein by reference for all purposes.

TECHNICAL FIELD

The present disclosure relates to compositions comprising styrenic block copolymers (SBCs) for use in making oil gels and methods of preparing same.

BACKGROUND

U.S. Pat. No. 9,304,231 discloses a gel composition useful in fiber optic cable which has the normal consistency of a grease but which, if desired, will become a rubbery coherent gel upon heating; a method of making the heat-fusible gel, and a method of making a spliceable fiber optic cable, and a fiber optic cable. In the broadest sense, a heat-fusible oil gel composition for fiber optic cable is disclosed, comprising from 50 to 80 wt. % of a grease-like gel based on a hydrocarbon oil containing from 2 to 10 wt. % of an S-EB or S-EP diblock polymer, or a mixture of these diblock copolymers, and from 20 to 50 wt. % of a grease-like gel based on a polar oil containing from 5 to 25 wt. % of an S-EB-S or S-EP-S triblock copolymer, or a mixture of these triblock copolymers.

U.S. Pat. No. 6,881,776 discloses two-phase gel compositions obtained by mixing a gelled ester composition comprising a mixture of an ester compound and a polymer compound selected from the group consisting of triblock copolymers, star polymers, radial polymers, multi-block copolymers, and a combination thereof and a hydrophobic, nonpolar solvent. The two-phase gel compositions are also obtained by mixing a gelled ether composition, a gelled alcohol composition, a gelled naturally-occurring fat and oil composition or a combination thereof with a hydrophobic, nonpolar solvent. The two-phase gel compositions may be used to suspend various solids, liquids and/or gases.

There exists an ongoing need for improved gel compositions that can provide utility in various applications such as flooding gels for cables.

SUMMARY

Figure 1:
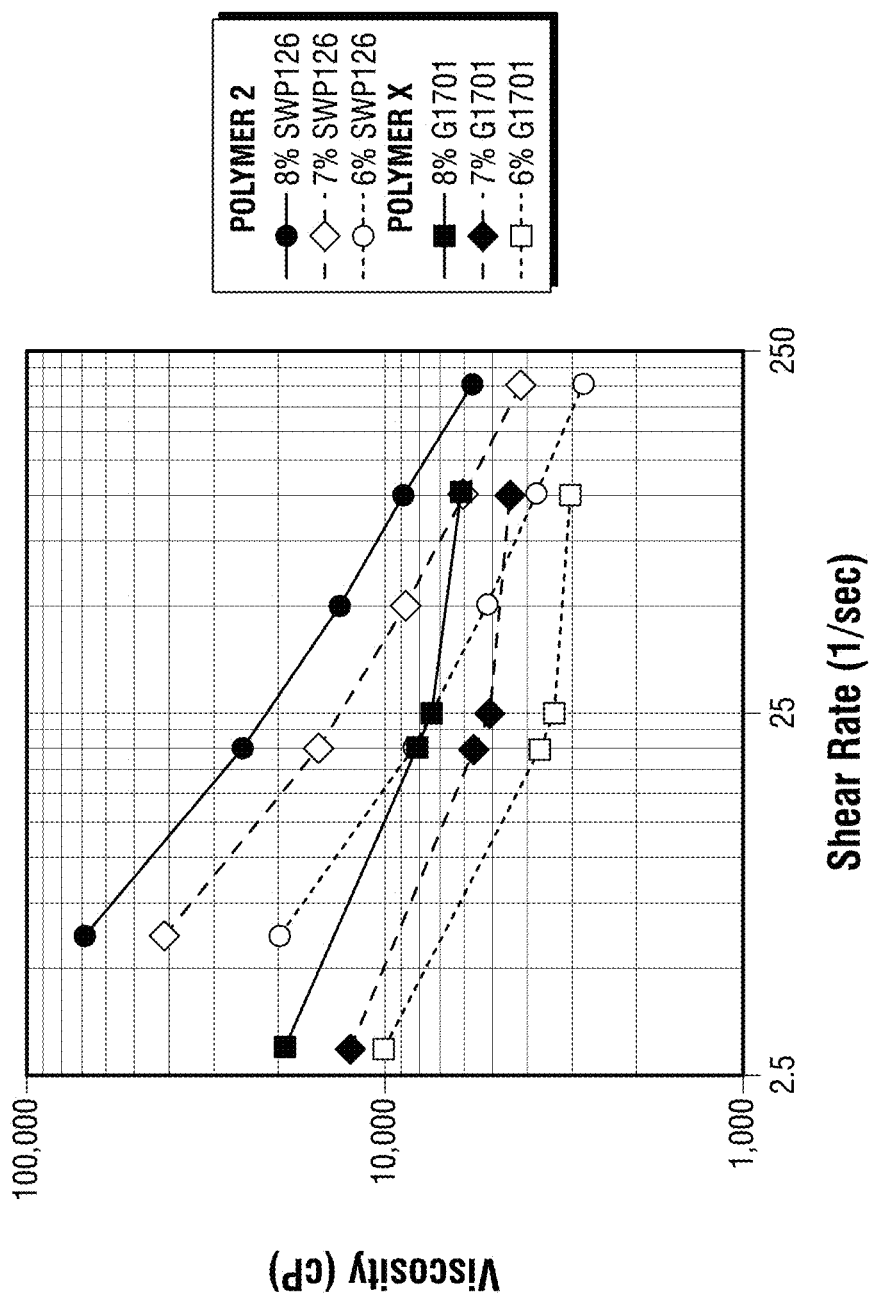
FIG. 1 depicts the viscosity of uncured oil gels as a function of shear rate.

In one aspect, the disclosure relates to a gel composition comprising: (i) a styrenic block copolymer, (ii) an oil; an and (iii) optional additives; wherein the styrenic block copolymer has a structure ABi or iAB, where A is a monoalkenyl arene block, B is a conjugated diene block, and i is an isoprene attachment. The isoprene attachment is substantially unsaturated and B is substantially saturated. The monoalkenyl arene block has a molecular weight ranging from 35 kg/mol to 100 kg/mol. The gel composition exhibits thixotropic behavior before being cured. The gel composition before curing is not solid and has a viscosity at 25° C. ranging from about 5000 mPa·s to about 30000 mPa·s. at a shear rate of 20 $s^{-1}$.

In another aspect, the disclosure relates to a method for making a gel composition. The method comprises the steps of: a) providing a styrenic block copolymer having a structure ABi or iAB, where A is a monoalkenyl arene block, B is a conjugated diene block, and i is an isoprene attachment; i is substantially unsaturated and B is substantially saturated; b) providing an oil and optional additives; c) mixing the styrenic block copolymer with the oil and optional additives; and d) curing the mixture by any of UV irradiation, thermal treatment, or both, forming an oil gel.

In yet another aspect, the disclosure relates to a method comprising introducing a gel composition into an interior volume or void space of a cable, for example a fiber optic cable, and curing the composition disposed within the cable to form a solid material.

DESCRIPTION

"Molecular weight" or MW refers to the styrene equivalent molecular weight in g/mol of a polymer block or a block copolymer. MW can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. MW of polymers measured using GPC so calibrated are styrene equivalent molecular weights or apparent molecular weights. MW expressed herein is measured at the peak of the GPC trace and are commonly referred to as styrene equivalent "peak molecular weights", designated as $M_p$. With polymers that are narrow in distribution, the peak value is close in value to the weight average value.

"Vinyl content" refers to the polymer product that is made when 1,3-butadiene is polymerized via a 1,2-addition mechanism, resulting in a monosubstituted olefin, or vinyl group, adjacent to the polymer backbone. The effects of 3,4-addition polymerization of isoprene on the final properties of any block copolymer will be similar to those from 1,2-addition of butadiene.

"Thixotropic behavior" or "thixotropic character" means that a composition should exhibit high apparent viscosity at low shear and much lower viscosity at high shear, and also does not drain freely from a vertical surface.

"Solid" as referring to a gel composition means the composition is firm and stable in shape under gravity, e.g., an elastic gel.

The polystyrene content (PSC) in block copolymers may be determined using proton nuclear magnetic resonance (NMR).

Viscosities can be measured by a Haake Rheostress 150 rheometer in plate/cone geometry equipped with a Peltier TC81 hot plate. The cone has a diameter of 20 mm and an angle of 1°. A shear ramp was applied and shear rates at 20 $s^{-1}$ and 100 $s^{-1}$ are reported.

Viscosity can be measured using Brookfield viscometer for uncured samples, and Ares rheometer can be used to measure viscosity of cured samples. Oil bleeding data can be collected by cone method at 100° C. for 24 hours.

Disclosed herein are methods for the preparation of an oil gel. In an aspect, the oil gel comprises i) a styrenic block copolymer, ii) an oil and iii) optional additives. In an aspect, the oil gels take the form of a thixotropic blend which can subsequently be transformed to a solid material. Herein a thioxotropic blend refers to an oil gel exhibiting thixotropic (shear thinning) behavior and therefore has a significantly lower viscosity at high shear versus low or no shear. Transformation of the thixotropic blend to a solid material may be accomplished by curing such as thermal curing or UV curing. In some aspects, the composition additionally comprises a material to facilitate curing of the compositions such as an initiator.

In an aspect, an oil gel comprises a styrenic block copolymer (SBC), alternatively a diblock copolymer. A diblock copolymer suitable for use in the present disclosure contains a polymer block of a monoalkenyl arene, denoted an A block, a polymer block of one or more conjugated dienes, denoted a B block, and an isoprene tail, denoted i.

In an aspect, the A block of the diblock copolymer is formed from monomers comprising styrene, alpha-methylstyrene, para-methyl styrene, vinyl toluene, vinylnaphthalene, diphenyl ethylene, para-butyl styrene, or mixtures thereof; alternatively the A block is formed from monomers comprising, consisting of, or consisting essentially of styrene.

In an aspect, the apparent molecular weight of the A block in the diblock copolymer ranges from about 3 kg/mole to about 100 kg/mol, alternatively from about 3 kg/mol to about 60 kg/mol or alternatively from about 5 kg/mol to about 50 kg/mol. In one aspect, the molecular weight of block A is at least 30 kg/mol, or at least 35 kg/mol, or at least 40 kg/mol, or in a range of 35 to 100 kg/mol.

In an aspect, the A block may be present in an amount of from 0 wt. % to 100 wt. % based upon the total weight of the diblock copolymer.

In an aspect, a diblock copolymer (e.g., iAB or ABi) has a polystyrene content of from about 2% to about 50%, alternatively from about 2% to about 45%, alternatively from about 10% to about 40% or alternatively from about 20% to about 40%.

In an aspect, the B block of the diblock copolymer is formed from monomers comprising a conjugated 1,3-butadiene or conjugated substituted butadienes such as, piperylene, 2,3-dimethyl-1,3-butadiene, 1-phenyl-1,3-butadiene or mixtures thereof The B block may have an apparent molecular weight ranging from about 30 kg/mole to about 300 kg/mol or alternatively from about 50 kg/mol to about 250 kg/mol. In an aspect, the B block may be present in an amount of from 0 wt. % to 100wt. % based upon the total weight of the block copolymer.

In an aspect, the iAB comprises an isoprene attachment, referred to herein as an isoprene tail. The isoprene attachment refers an isoprene polymer. It is to be understood that in the disclosure the "isoprene tail" may be attached to either A or B block. The isoprene tail can be associated with either the A block and designated iAB or with the B block and designated ABi, and can be prepared by anionic polymerization. A short isoprene tail attached to the polystyrene block remains partially unsaturated after hydrogenation of the block copolymer. In an aspect, the short isoprene tail has a molecular weight of from about 2 kg/mol to about 15 kg/mol. Without wishing to be limited by theory, the isoprene tail may facilitate curing of the polymer composition.

In an aspect, the diblock copolymer (e.g., iAB or ABi) comprises less than about 5 wt. % of a triblock copolymer (e.g., ABA) based on the total weight of the diblock copolymer, alternatively less than about 2 wt. %, or alternatively less than about 1 wt. %. In an aspect, a diblock copolymer suitable for use in the present disclosure (e.g., iAB) excludes a triblock copolymer.

Polymerization conditions to prepare a diblock copolymer of the type disclosed herein (e.g., iAB or ABi) are similar to those used for anionic polymerizations. For example, the polymerization may be carried out at a temperature of from about −30° C. to about 150° C. in an inert atmosphere such as nitrogen, under a pressure within the range of from about 0.5 to about 10 bars. Suitable reaction conditions also include one or more polymerization initiators, for example, alkyl lithium compounds such as s-butyllithium, n-butyllithium, t-butyllithium, amyllithium and the like. Additional disclosure on the preparation of a diblock copolymer can be found in U.S. Pat. No. 7,220,798, the relevant portions of which are incorporated herein by reference.

The diblock copolymers (e.g., iAB) may be subjected to post-polymerization hydrogenation. In an aspect, the diblock copolymers are subjected to selective hydrogenation of the diene portions of the copolymer to produce a partially hydrogenated diblock copolymer. In an aspect, at least 75% of the double bond, including at least any of 90%, 95%, or 98% of the vinyl substituents resulting from 1,2 addition, are hydrogenated, while about 20% to less than any of 35, 40, 50, or 60% of the double bonds in the isoprene tail are hydrogenated. In one embodiment, about 30% to about 50% of the double bonds in the isoprene tail are hydrogenated. In an aspect, hydrogenation of a diblock copolymer of the type disclosed herein results in a percent conversion (hydrogenation level) of the B block, herein designated α, and a percent conversion of the isoprene tail, herein designated β, where α is greater than β.

In an aspect, the difference in the hydrogenation level the B block and isoprene tail is equal to or greater than about 20%, alternatively equal to or greater than about 50%, alternatively from about 20% to about 80%, or alternatively from about 29% to about 69%. In another aspect, the total residual unsaturation (RU) is less than or equal to 2.5 milliequivilent per gram (meq/g) as measured by $^1$H NMR or ozone titration. In another aspect, a block copolymer of the type disclosed herein has a RU of from about 0.2 to about 4, alternatively from about 0.4 to about 3. Without wishing to be limited by theory, this may ensure sufficient reactivity to provide the crosslinking needed to achieve the objectives of the present disclosure while providing a sufficient decrease in residual unsaturation in the B block to realize the benefits of hydrogenation. Hydrogenation of the diblock copolymers generally improves thermal stability, ultraviolet light stability, oxidative stability, and weatherability of the final polymer. Hydrogenation can be carried out using any suitable methodology. For example, such hydrogenation methodologies are disclosed in U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, can comprise a Group VIII metal such as nickel or cobalt which is combined with a suitable reducing agent such as an aluminum alkyl or hydride of a metal selected from Groups I-A, II-A and III-B of the Periodic Table of the Elements, such as lithium, magnesium or aluminum.

In an aspect of the present disclosure, a diblock copolymer which is an isoprene-styrene/butadiene (i-SB) polymer is synthesized. Upon hydrogenation, the butadiene is hydrogenated while the isoprene tail is only partially hydrogenated (e.g., designated i-S/EB). The unsaturation remaining in the isoprene tail can then be cured/crosslinked to transform an oil gel, of the type disclosed herein, from a thixotropic blend into a solid gel.

In an aspect, a diblock copolymer of the type disclosed herein (e.g., iAB) is present in the oil gel in an amount of from about 1 wt. % to about 30 wt. % based on the total weight of the oil gel, alternatively in an amount of from about 3 wt. % to about 15 wt. % based on the total weight of the oil gel, alternatively in an amount of about 6 wt. %, or alternatively about 8 wt. % based on the total weight of the oil gel.

In an aspect, an oil gel of the present disclosure comprises an oil such as paraffinic oils, mineral oils, gas to liquid (GTL) oils, synthetic oils, or combinations thereof In an aspect, the oil of the oil gel comprises a paraffinic oil. In some aspects, the paraffinic oil includes an oil-enriched in paraffin. Alternatively, a paraffinic oil is characterized by the presence of hydrocarbons having from 12 carbon atoms to 50 carbon atoms. Alternatively, the paraffinic oil includes a paraffin having an average number of carbon atoms that is less than or equal to about 20 (e.g., 16). In certain aspects, the paraffinic oil includes a paraffin having an average number of carbon atoms of from 16 to 30. In some aspects, a paraffinic oil suitable for use in the present disclosure can be a mixture of oils.

In an aspect, the oil of the oil gel comprises a mineral oil. Mineral oils are highly refined, colorless, and odorless petroleum oils. Mineral oil (also known as liquid petrolatum) is a by-product in the distillation of petroleum to produce gasoline. Mineral oil is a chemically inert oil composed mainly of linear, branched, and cyclic alkanes (paraffins) of various molecular weights.

In an aspect, the oil of the oil gel comprises a GTL-based process oil. GTL-based process oil is also referred to as Fischer-Tropsch derived oil. The term "Fischer-Tropsch derived" refers to a base oil, that is or is derived from, a synthesis product of a Fischer-Tropsch process. GTL-based process oils have a uniform chemical structure because they are manufactured from hydrocarbons derived from natural gas rather than crude oil.

In an aspect, the oil of the oil gel comprises a synthetic oil. Herein a synthetic oil refer to those oils that include non-naturally occurring components derived through chemical processes.

In an aspect, the oil gel comprises a mineral oil, a synthetic oil, or paraffinic fluids; or an internal olefin. Alternatively, the oil gel comprises a low toxicity synthetic oil, alternatively paraffinic oil, or alternatively internal olefin fluids such as $C_{16}$-$C_{18}$ internal olefin hydrocarbons. Suitable mineral oils may be naphthenic- or paraffinic-based. In some aspects, the oil comprises diesel, biodiesel and carboxylic acid esters such as 2-ethylhexyl oleate. Other nonlimiting examples of oils suitable for use in the present disclosure include a white mineral oil such as DRAKEOL34. In an aspect, the oil is a GTL-based process oil, e.g., a hydrocarbon fluid based on Gas-to-Liquid technology that is highly saturated with a high degree of isoparaffinic structures.

In an aspect, an oil of the type disclosed herein (e.g., paraffinic, mineral, GTL, etc.) is present in the oil gel in an amount of from about 70 wt % to about 99 wt % alternatively from about 85 wt % to about 97 wt % based on the total weight of the oil gel.

Oil gels of the type disclosed herein may optionally comprise an antioxidant. For example, antioxidants and other stabilizing ingredients can be added to protect the oil gel from degradation induced by heat, light and processing or during storage. Several types of antioxidants can be used, either primary antioxidants like hindered phenols or secondary antioxidants like phosphite derivatives or blends thereof. Examples of antioxidants suitable for use in the present disclosure are sterically hindered phenol type antioxidants and liquid phenolic antioxidants.

In some aspects, the oil gel optionally comprises a metal deactivator. Examples of suitable metal deactivators include REOMEL 39 LF and other commercially available products known in this field.

In some aspects, the oil gel optionally comprises a rheology modifier. Rheology modifiers may be included in the oil gel to meet one or more user or process goals, such as the adjusting the flow properties of the oil gel. In aspect, the rheology modifier is an inorganic material such as fumed silica or specialty clays such as attapulgites, and the like. A nonlimiting example of a rheology modifier is CABOSIL TS720 from Cabot Corp.

In an aspect, the oil gel may comprise additives of the type disclosed herein in amounts ranging from about 0.001 wt. % to about 5 wt % based on the total weight of the oil gel.

In an aspect, an oil gel comprising a diblock copolymer (e.g., iAB), an oil, and optionally additives, all of the type disclosed herein, may be prepared by contacting the diblock copolymer with the oil. For example, the diblock copolymer may be present in the oil gel in an amount ranging from about 1 wt. % to about 30 wt. % alternatively ranging from about 2 wt. % to about 20 wt. % or alternatively ranging from about 3 wt. % to about 15 wt. %. Consequently, the oil gel may have an SBC:oil ratio of from about 0.01:1 to about 0.3:1 alternatively from about 0.02:1 to about 0.2:1 or alternatively from about 0.03:1 to about 0.15:1.

In an aspect, the oil gel may have a viscosity at 25° C. at a shear rate of 20 $s^{-1}$ ranging from about 500 mPa·s to about 500000 mPa·s, alternatively from about 2000 mPa·s to about 300000 mPa·s or alternatively from about 3000 mPa·s to about 100000 mPa·s as determined by rheometry. In an aspect, the oil gel may have a viscosity at 25° C. at a shear rate of 100 $s^{-1}$ ranging from about 200 mPa·s to about 40000 mPa·s, alternatively from about 1500 mPa·s to about 30000 or alternatively from about 1500 mPa·s to about 27000 mPa·s as determined by rheometry. In an aspect, contacting the diblock copolymer and the oil yields an oil gel in the form of a thixotropic blend. Thixotropic refers to the shear thinning behavior of the material. A method of the present disclosure may further comprise subjecting the thixotropic blend to one or more techniques that transforms the thixotropic blend into a solid material.

In an aspect, transformation of the thixotropic blend to a solid material is effected by curing. Curing of the thixotropic blend may be carried out by ultraviolet (UV) irradiation or by thermal treatment.

In an aspect, the oil gel (e.g., thixotropic blend) is contacted with a curable functional compound to form a curing composition, and subsequently cured by UV radiation to form a cured solid material (CSM). The curable functional compound can be made up of monomers of aliphatic polyol acrylates or methacrylates. In an aspect, the curable functional compound includes monomers having one or more, alternatively two, acrylate or methacrylate groups. Examples of curable compounds suitable for use in the present disclosure include without limitation one or more of 1,4-butanediol diacrylate, 1,6-hexanediol diacrylate, 1,6-hexanediol dimethacrylate, 1,12-dodecanediol dimethacrylate, trimethylol propane triacrylate, or dipentaerythritol monohydroxy-pentaacrylate. In some aspects, the curable functional compound will include hexanediol diacrylate, hexanediol dimethylacrylate or butanediol diacrylate.

In an aspect, the curable functional compound comprises 1,6 hexanediol diacrylate and may be contacted with the oil gel in an amount of from about 3.0 wt. % to about 15 wt. % or alternatively from about 4 wt. % to about 10 wt. % based on the total weight of the oil gel.

The curing composition can be cured with natural or artificial UV radiation. In an alternative aspect, the curing composition is cured with an electron beam. The curing composition can be crosslinked within a cable (for example, a thin UV transparent cable) to become a cohesive solid material. The curing composition can be crosslinked within the cable by exposing the curing composition to UV radiation to form a solid composition that is cohesive within the cable. The curing composition forms a solid composition, designated the cured solid material (CSM) and will not flow within or from the cable when, for instance, the cable is cut.

In aspects where the curing composition comprises a curable compound, the oil gel may have a viscosity at 25° C. at a shear rate of 20 s$^{-1}$ ranging from about 10000 mPa·s to about 600000 mPa·s or alternatively from about 30000 mPa·s to about 200000 mPa·s as determined by rheometry. An oil gel may have a viscosity at 25° C. at a shear rate of 100 s$^{-1}$ ranging from about 5000 mPa·s to about 80000 mPa·s alternatively from about 8000 mPa·s to about 50000 mPa·s as determined by rheometry.

In an aspect, the oil gel (e.g., thixotropic blend) is contacted with one or more initiators to form a second mixture (e.g., a curing composition) and subsequently cured by a thermal treatment to form a CSM. For example the oil gel may be contacted with a photoinitiator, such as IRGA-CURE 651 from BASF, in an amount of from about 0.2 wt. % to about 2 wt. % based on the total weight of the oil gel.

In an aspect, the composition comprising the oil gel and initiator is subjected to a thermal treatment. Thermal treatment may include subjecting the oil gel to an elevated temperature for a sufficient time to effectuate curing of the oil gel to form a CSM. For example, the oil gel may be heated to a temperature ranging from about 150° C. to about 200° C. or alternatively, about 160° C. to about 190° C. for a period of time ranging from about 1 minutes to about 20 minutes or alternatively, about 5 minutes to about 15 minutes. For example, the composition comprising the oil gel and initiator may be introduced to the cable in a time period after extrusion of the cable but prior to dissipation of the heat associated with the extrusion of the cable such that the residual heat associated with extrusion is sufficient to cure the material (e.g., oil gel and initiator) disposed within the cable.

In an aspect, the initiator comprises a thermal initiator, that is, a radical initiator which decomposes at a certain temperature to form radicals. In some aspects, the curing composition comprises the oil gel, a diacrylate (e.g., HDDA), and a thermal initiator. Nonlimiting examples of thermal radical initiators are peroxide compounds and azo compounds. A thermal radical initiator suitable for use in the present disclosure may have a half-life ($\tau_{1/2}$) of from about 1 minute to about 10 minutes or alternatively from about 1 minute to about 6 minutes. Herein the half-life refers to the time after which the quantity of material decomposes to one half of its original value.

Azo compounds and peroxy compounds suitable for use in the present disclosure are additionally described in the Encyclopedia of Polymer Science and Engineering, John Wiley & Sons (1988), volume 2, pages 143-157 and volume 11, pages 1-21 respectively, incorporated herein by reference. In an aspect, the thermal radical initiators comprise those initiators that are commonly used in the radical polymerization of styrene to manufacture polystyrene. Nonlimiting examples of commercially available compounds include (2,2'-azobis(isobutyronitri-le); 2,2'-azobis(2,4-dimethylvaleronitrile); 1,1'-azobis-(cyclohexanecarbo-nitrile); benzoyl peroxide; t-butyl 2-methylperbenzoate; dicumyl peroxide; t-butyl cumyl peroxide; di-t-butylperoxide; 1,1-di (t-butyl-peroxy)-3,3,5-trimethylcyclohexane; dilauroyl peroxide; di(2-ethylhexyl)peroxydicarbonat-e; t-amyl peroctoate; t-butyl peracetate; t-butyl perbenzoate; 2,5-bis (benzoyl-peroxy)-2,5-dimethylhexane; di-t-butyldiperoxyazelate; 1,1-di(t-butylperoxy)cyclohexane, or combinations thereof.

The resulting curing composition including an oil gel and a thermal initiator as disclosed herein, can further comprise an aliphatic or cycloaliphatic diluent (e.g., processing aids, plasticisers, liquid resins, extending oils), or a mixture of diluents, compatible with the components of the oil gel. Suitable aliphatic and cycloaliphatic plasticizer or extending oils (collectively referred to herein as "diluent") can include, but are not limited to the following: paraffinic process oils; naphthenic oils; fully or highly hydrogenated process oils; waxes; liquid hydrogenated aromatic resins; liquid polyalphaolefins; and liquid polymers such as hydrogenated polyisoprene, hydrogenated polybutadiene or polybutene-1. Said diluent may be added to the oil gel (e.g., the thixotropic blend) prior to the curing thereof.

In other aspects, the diluent may be 50% or more of the composition by weight, 75% or more of the composition by weight, 85% or more of the composition by weight, 90% or more of the composition by weight, and still further 93% or more of the composition by weight, to 95% of the composition by weight. The amount of diluent will depend on the end use application. While such ranges are useful for compositions for use as fillers in cables, the amount of diluent will depend on the end use application. For example, sealants may use less than 50% of a diluent.

Examples of diluents suitable for use in the curing compositions herein disclosed include, but are not limited to white mineral oil, an oligomer of polyvinyl type such as polybutene, hydrogenated polybutene, hydrogenated alpha-olefin oligomer or atactic polypropylene; an aromatic oligomer such as biphenyl or triphenyl, and its complete or partial hydrogenation products; a hydrogenated polyene oligomer such as hydrogenated liquid polybutadiene; a paraffin such as paraffin oil or chlorinated paraffin; a cycloparaffin such as naphthene oil; a phthalic acid ester such as dibutyl phthalate, diheptyl phthalate, di(2-ethylhexyl)phthalate, butylbenzyl phthalate, di-n-octyl phthalate, diisononyl phthalate, diisodecyl phthalate or diundecyl phthalate; a non-aromatic dibasic acid ester such as di(2-ethylhexyl) adipate, di-n-octyl adipate, diisononyl adipate, diisodecyl adipate, di(2-ethylhexyl)sebacate or di-2-ethylhexyl tetrahydrophthalate; an aromatic ester such as tri-2-ethylhexyl trimellitate or triisodecyl trimellitate; a fatty acid ester such as butyl oleate, methyl acetylrecinolate or pentaerythritol ester; a polyalkylene glycol ester such as diethylene glycol benzoate or triethylene glycol dibenzoate; a phosphoric acid ester such tricresyl phosphate or tributyl phosphate; an epoxy plasticizer such as epoxidated soybean oil or epoxidated linseed oil; an alkylsulphonic phenyl ester and the like. These may be used alone or in admixture thereof.

The curing composition can further comprise a resin, depending on the end use application. The resin may be partially or fully hydrogenated aliphatic hydrocarbon resins, hydrogenated rosin ester or partially or fully hydrogenated aromatic hydrocarbon resins. A resin may be added to the oil gel (e.g., the thixotropic blend) prior to the curing thereof. Suitable resins can include, but are not limited to the following: hydrogenated styrene-based resins; a 60% hydrogenated aromatic resin; hydrogenated resins based on $C_5$ and/or $C_9$ hydrocarbon; hydrogenated polycyclopentadienes; hydrogenated polyterpene and other naturally occurring resins.

The resin may be present in the curable polymeric composition an amount of from about 1% to about 15% by weight or alternatively about 1% to about 5% by weight based on the total weight of the curing composition.

Stabilizers such as antioxidants/UV stabilizers/radical scavengers including, but not limited to phenols, organometallic compounds, aromatic amines, aromatic phosphites and sulfur compounds can also be added to the curable polymeric composition. Other examples of stabilizers can include phenolic antioxidants, thio compounds and tris (alkyl-phenyl)phosphites. Stabilizers may be added to the oil gel (e.g., the thixotropic blend) prior to the curing thereof Examples of commercially available antioxidants/radical scavengers are pentaerythrityl-tetrakis(3,5-di-tert-butyl-4-hydroxy-hydrocinnamate); octadecyl ester of 3,5-bis(1,1-dimethylethyl)-4-hydroxy benzene propanoic acid; 2,4-bis(n-octyl-thio)-6-(4-hydrox-y-3,5-di-tert-butylanilino)-1,3,5-triaz-ine; 2-tert-butyl-6-(3-tert-butyl-2'-hydroxy-5-methylbenzyl)-4-methylphenyl acrylate; tris(nonylphenyl) phosphite; tris(mixed mono- and di-phenyl)-phosphite; bis (2,4-di-tert-butylphenyl)-pentaerythritol diphosphite; distearyl pentaerythritol diphosphite; styrenated diphenylamine; N-1,3-dimethylbutyl-N'-phen-yl-paraphenylene-diamine; tris(2,4-di-tert-butylphenyl) phosphite; and 4,4-butylidene-bis-(3-methyl-6-tert-butylphenol).

The stabilizer may be present in the curable polymeric composition in a total amount from 0.01 to 5% by weight, basis the total curable polymeric composition or alternatively 0.1% to 3% by weight.

In some aspects, the curing composition comprises a curing accelerator. Any curing accelerator compatible with the compositions of the present disclosure may be employed. For example, the curing accelerator is a composition comprising at least one dithiocarbamate, at least one thiazole, and at least one guanidine compound. In an aspect, the dithiocarbamate compound comprises zinc diethyldithiocarbamate, the thiazole compound comprises zinc 2-mercaptobenzothiazole, also known as zinc dimercaptobenzothiazole and the guanidine compound comprises diphenyl guanidine, also known as DPG. Other dithiocarbamate, thiazole and guanidine derivatives can also be use in accordance with the present disclosure, provided each is chemically compatible with, i.e., does not substantially interfere with the functionality of, the remaining two accelerator compounds used. Dithiocarbamate derivatives which can also be used include zinc dimethyldithiocarbamate, sodium dimethyldithiocarbamate, bismuth dimethyldithiocarbamate, calcium dimethyldithiocarbamate, copper dimethyldithiocarbamate, lead dimethyldithiocarbamate, selenium dimethyldithiocarbamate, sodium diethyldithiocarbamate, ammonium diethyldithiocarbamate, copper diethyldithiocarbamate, lead diethyldithiocarbamate, selenium diethyldithiocarbamate, tellurium diethyldithiocarbamate, zinc dibutyldithiocarbamate, sodium dibutyldithiocarbamate, dibutyl ammonium dibutyldithiocarbamate, zinc dibenzyldithiocarbamate, zinc methylphenyl dithiocarbamate, zinc ethylphenyl dithiocarbamate, zinc pentamethylene dithiocarbamate, calcium pentamethylene dithiocarbamate, lead pentamethylene dithiocarbamate, sodium pentamethylene dithiocarbamate, piperidine pentamethylene dithiocarbamate, and zinc lopetidene dithiocarbamate. Other thiazole derivatives which can be used include 2-mercaptobenzothiazole, copper dimercaptobenzothiazole, benzothiazyl disulphide, and 2-(2'4'-dinitrophenylthio) benzothiazole. Other guanidine derivatives which can be used include diphenyl guanidine acetate, diphenyl guanidine oxalate, diphenyl guanidine phthalate, di-o-tolyl guanidine, phenyl-o-tolyl guanidine, and triphenyl guanidine. Additional commonly used curing accelerators are amine accelerators, cobalt accelerators, and cobalt alternative accelerators. In an aspect, the curing composition may comprise a curing accelerator in an amount of from 0.1% to 3% by weight based upon the total weight of the curing composition.

In an aspect, the oil gel is combined with an initiator, and one or more optional additives to obtain a curing composition that is a thixotropic blend for use in cable filling compositions and subsequently transformed via curing into a CSM. In another aspect, the compositions of the present disclosure could be used as a filling or protectant material for cables, including fiber optic cables. In another aspect, the oil gels and/or CSMs disclosed herein may be components of an oilfield servicing composition such as insulating packer fluids, transportation slurries, drilling muds, and drill-in fluids. Alternatively, the oil gels and/or CSMs may function as an additive for personal care products such as cosmetic oils and greases. Additional nonlimiting examples of materials that may include an oil gel and/or CSM of the type disclosed herein are heat transfer fluids, cleaning and degreasing agents, process oils, agricultural gels for seeds, crop protection and grain dust suppression, textile coatings, concrete molds, shoe polish, paint, paint remover, furniture oils, wood preservatives, heating or fuel, potting gels (LED, Seismic, etc.), base stock oils, shock absorber fluids, compressor oils, lubricants, and metal working fluids.

EXAMPLES: The subject matter of the present disclosure having been generally described, the following examples are given as particular aspects of the disclosure and to demonstrate the practice and advantages thereof. It is understood that the examples are given by way of illustration and are not intended to limit the specification or the claims to follow in any manner.

Example 1: The materials used in this example are listed in Table 1.

TABLE 1

| Trade name | Description/source |
|---|---|
| SBC diblock | Styrene-ethylene/propylene (S-E/P) block copolymer, 35% PSC, Residual unsaturation <0.12 meq/g |
| Polymer 1 | Partially unsaturated Kraton G block copolymer, of structure i-A-B, with block size of 6-39-57 kg/mol respectively (or the A block having a MW of 39 kg/mol), with a short isoprene tail attached to PS block (i-S-E/B), 38% PSC, 2.05% meq/g total RU (residual unsaturation); RU in isoprene block = 0.47 meq/g (50% of initial), RU in butadiene block = 1.57 meq/g (21% of initial). |

TABLE 1-continued

| Trade name | Description/source |
|---|---|
| Primol 352 | medicinal, white oil, ExxonMobil |
| HDDA | 1.6-hexanediol diacrylate, Aldrich |
| Luperox DCP | solid peroxide, activation temperature = 170° C., melting temperature = 50° C., half lifetime at 180° C. = 1 min, half lifetime at 160° C. = 6 min, Arkema |
| Irgacure 651 | 2,2 dimethoxy-1,2 diphenylethan-1-one, photo initiator, BASF |
| Irganox 1010 | primary anti-oxidant, hindered phenol, BASF |

Oil gels were typically prepared by heating the oil and anti-oxidant to 130° C., then incorporating the diblock copolymer under high or low shear mixing. During mixing, the temperature was raised to 160° C. for a short period of time. After full incorporation of the block copolymer in the oil gel and obtaining a homogeneous oil gel, other ingredients such as HDDA, Luperox DCP or Irgacure 651 was added. Addition of HDDA was done at low shear, upon cooling of the gel to 120° C. Luperox DCP was incorporated at 60° C. and the blends tumbled for 1 night to ensure full incorporation and dispersion in the system. Thermal curing with this peroxide was done in an oven at 190° C. for a period of 10 minutes.

Irgacure 651 was added to allow for UV curing of the oil gels. Samples with a size of ±10 cm$^2$ and a weight of 5 g were cured with a UV mercury medium pressure lamp. Samples were passed 6 times under the lamp at a speed of 5 m/min to ensure full curing. After each pass, the samples were turned upside down. A UV compact radiometer was used to check the UV dose corresponding to the curing process. Each sample side was subjected to 10000 mJ/cm$^2$. A second series of samples was subjected to 30000 mJ/cm$^2$.

After preparation, the aspect and homogeneity of the gels were checked visually and their viscosity measured at 25° C., at shear rates of 20 s−1 and 100 s$^{-1}$ Table 3. Oil gels of paraffinic oil, 8% weight of SBC diblock or Polymer 1, peroxide or photo initiator, were prepared respectively for thermal and UV curing. These blends were made with and without diacrylate (HDDA).

Before curing, all formulations were thixotropic blends as indicated by the significant difference in rheology at low shear (20 s$^{-1}$) and at 100 s$^{-1}$.

Thermal curing of the oil gels containing Polymer 1 led to solid gels, also in the absence of HDDA. The presence of HDDA further enhanced viscosity as well as strength. UV curing led to rubbery, solid gels. In presence of HDDA, the viscosity after curing was significantly higher than without HDDA. Increasing the UV curing dose did not lead to a further raise in viscosity. A raise in viscosity was achieved by thermal curing of the oil gel based on the SBC diblock polymer. The system however remained a grease and didn't turn into a strong gel. The results are presented in Table 2.

TABLE 2

| Sample number | 1 | 2 | 3 | 4 | 5 | | 6 | |
|---|---|---|---|---|---|---|---|---|
| SBC diblock | 8.0 | 8.0 | — | — | — | | — | |
| Polymer 1 | — | — | 8.0 | 8.0 | 8.0 | | 8.0 | |
| Irgacure 651 | — | — | — | — | 0.3 | | 0.3 | |
| Primol 352 | 91.9 | 84.9 | 89.9 | 84.9 | 91.6 | | 86.6 | |
| HDDA | — | 5.0 | — | 5.0 | — | | 5.0 | |
| Luperox DCP | — | 2.0 | 2.0 | 2.0 | — | | — | |
| Irganox 1010 | 0.1 | 0.1 | 0.1 | 0.1 | 0.1 | | 0.1 | |
| Properties | | | | | | | | |
| Viscosity at 25° C. mPa · s before curing, at a shear rate of | | | | | | | | |
| 20 s$^{-1}$ | 8200 | 5900 | 19600 | 12000 | 20000 | | 11200 | |
| 100 s$^{-1}$ | 6100 | 3500 | 9200 | 6000 | 8800 | | 5800 | |
| Curing technique | — | thermal | Thermal | | UV 10000 mJ/m$^2$ | UV 30000 mJ/m$^2$ | UV 10000 mJ/m$^2$ | UV 30000 mJ/m$^2$ |
| Viscosity at 25° C. mPa · s after curing, at a shear rate of | | | | | | | | |
| 20 s$^{-1}$ | n.a. | 32400 | 70800 | 120000 | 37000 | 36000 | 105000 | 102000 |
| 100 s$^{-1}$ | n.a. | 9700 | 15800 | 31000 | 9600 | 7600 | 27000 | 17200 |
| Gel Content (wt. %) | n.a. | n.m. | 17 | 23 | 8 | | 19 | |
| Oil gel aspect after curing | grease | grease | solid | solid | solid | | solid | |

Example 2: Polymer 2, which is a diblock copolymer of the type ABi with block molecular weight of 43k-52k-10k was prepared, i.e., the A block having a molecular weight of 43 kg/mol. Hydrogenation was run in batch process using Co catalyst with Al/Co ratio of 2.0. The final residual unsaturation (RU) is 0.97. As shown in Table 3, excellent hydrogenation selectivity between isoprene and butadiene has been achieved. More than 96% of RU is in isoprene block, while the B block contains negligible amount of RU. The polymer, designated Polymer 2, was finished using cyclone without any issues.

TABLE 3

|  | RU (meq/g) | Hydrogenation level |
|---|---|---|
| 3,4- Ip | 0.05 | 27% |
| 1,4- Ip | 0.89 | 31% |
| 1,2- Bd | 0.01 | 100% |
| 1,4- Bd | 0.03 | 99% |
| Total | 0.97 | 91% |

Oil gels were prepared using the amounts of material as indicated in Table 4. Initially, the samples had typical oil gel formulation, i.e. with 8% polymer loading. But the oil gel with 8% polymer was a very thick grease at room temperature, and was not pourable thus the polymer loading was decreased to 6%, which became pourable and looks like a typical oil gel.

Formulations with 6% polymer with various amounts of peroxide were also made to evaluate the effects of cross-linking.

TABLE 4

| Sample | Block copolymer | PRIMOL 352 wt. % | Antioxidant | Initiator |
|---|---|---|---|---|
| 7 | 8 | 91.9 | 0.1 | — |
| 8 | 7 | 92.9 | 0.1 | — |

TABLE 4-continued

| Sample | Block copolymer | PRIMOL 352 wt. % | Antioxidant | Initiator |
|---|---|---|---|---|
| 9 | 6 | 93.9 | 0.1 | — |
| 10 | 6 | 93.7 | 0.1 | 0.2 |
| 11 | 6 | 93.5 | 0.1 | 0.4 |
| 12 | 6 | 93.3 | 0.1 | 0.6 |
| 13 | 6 | 93.1 | 0.1 | 0.8 |

Figure 3:
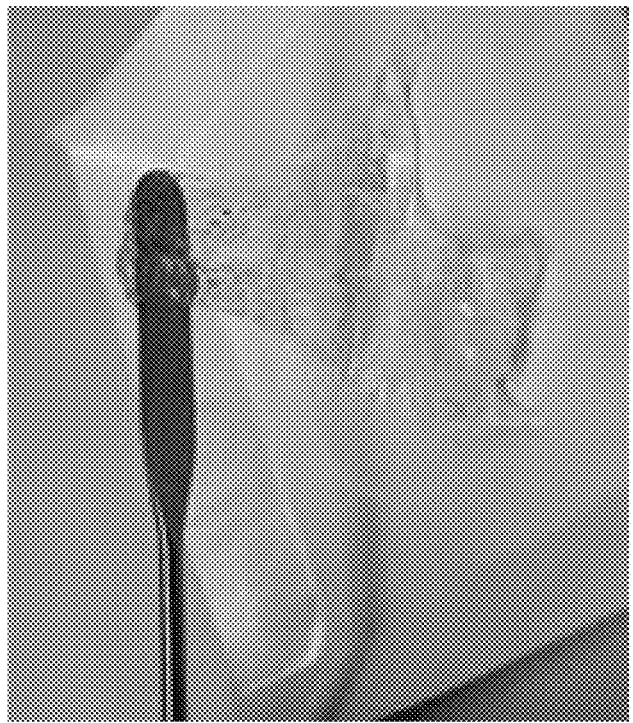
FIG. 3 presents a photo of cured oil gel.
Figure 2:
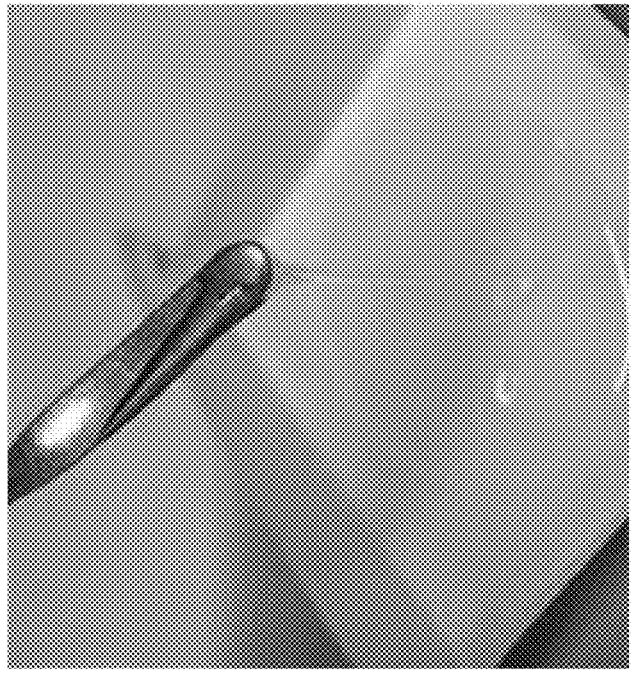
FIG. 2 presents a photo of uncured oil gel.

Oil gels were prepared by mixing oil, polymer and antioxidant at 130° C., rotor/stator mixer under high shear (~2,000 rpm) for about one hour. Once the mixture became homogeneous and was cooled to 70° C., peroxide was added. FIG. 1 shows the viscosity of uncured oil gels as a function of shear rate. Oil gels made with a Polymer 2 exhibited more shear thinning than oil gels made with a commercially available diblock copolymer, designated Polymer X. At low shear rate, 6% loading of Polymer 2 has about the same viscosity as 8% loading of Polymer X. At high shear rate, where pumpability is measured, 6% loading of Polymer 2 has much lower viscosity than 8% loading of Polymer X. An 8% loading of Polymer 2 should still have about the same pumpability as an 8% loading of Polymer X. The enhanced shear thinning observed with Polymer 2 may be caused by larger styrene block size, and is likely a desirable feature. FIG. 2 presents a photo of uncured oil gels. FIG. 3 presents a photo of cured oil gels, wherein the oil gel is solid.

Oil gels were cured in an oven at 190° C. for 10, 20, 30, and 40 minutes. Curing time here refers to the time oil gel samples sit inside an oven, the actual curing time is shorter because it takes some time for the oil gel samples to reach the oven temperature. At 10 minutes, oil gels are still pourable, while at 20-40 minutes, oil gel samples are solid. Table 5 compares oil gels before and after curing. Clearly, curing alters oil gel properties, sometimes drastically, in many aspects: (1) appearance changes from a pourable gel to an elastic solid; (2) there are significant amounts of high molecular weight polymer species after curing; (3) viscosity increases from ~9,000 cP to more than 1,600,000 cP; (4) oil bleeding decreases from 96% to basically 0%.

TABLE 5

|  | 126-1E 6% polymer + 0.4% peroxide | | 126-1G 6% polymer + 0.8% peroxide | |
|---|---|---|---|---|
| Appearance | Before Pourable gel | After Elastic solid | Before Pourable gel | After Elastic solid |
| Viscosity (cP at 20/s on Brookfield) | 9,048 | $1.66 \times 10^6$ (20° C.)* $1.63 \times 10^6$ (120° C.)* | 8,096 | $1.76 \times 10^6$ (20° C.)* $1.69 \times 10^6$ (120° C.)* |
| Oil Bleeding (100° C. 24 hr) | 96.5% | −1.1% | 96.3% | −0.5% |
| MW (GPC) | 237k, 3.3% 140k, 93.6% | 435k, 11.3% 371k, 7.2% 261k, 14.0% 133k, 42.3% 36k, 13.6% | 237k, 3.3% 140k, 93.6% | 354k, 17.2% 247k, 14.7% 127k, 51.5% 33k, 13% |
| Insolubles in toluene |  | 0% |  | 0% |

*Data collected on ARES parallel plates at 0.1 rad/sec

Oil gels after curing were elastic solids, therefore are not suitable for viscosity measurement on Brookfield viscometer, and ARES rheometer was used for viscosity measurement. Although it is not appropriate to directly compare viscosity data before and after curing (because the data were collected on different equipment), the large viscosity numbers of cured samples confirm that they are a soft solid. More importantly, viscosity of the cured samples remains high even when heated to 120° C. This behavior itself was also an indication of cohesive oil gels. Uncured samples behave very differently, and they lose viscosity and become liquid when heated to 100° C.

Cured oil gels made with Polymer 2 have zero insolubles in toluene, suggesting that little or no polymer network has been formed. GPC data confirms that only light crosslinking occurred. Cured samples contain about one third of high molecular weight polymers, that may include large SEBS molecules (2×, 3× and 4×) formed by light cross-linking of isoprene. Further, after curing, there is also a significant amount of low molecular weight species, suggesting some polymer chain scission occurred.

It is noted that the viscosity values in Table 5 are all measured at a shear rate of 20/s. Without applying shear, the viscosities of those gels are higher than 9,048 and 8,096 cP. The blends show shear thinning behavior and are thixotropic. It is further noted that not all of the gel compositions are pourable before curing. For example, the oil gel examples shown in Table 5, having 8% of polymer are not pourable before curing as they are thick greases (but not solid). The gels in Table 5, having 6% polymer, however, are pourable before curing. However, in all cases, after curing, they yield solid materials.

It was observed that prior to curing, the gel composition based on Polymer 1 and Polymer 2 exhibit the consistency of a grease and with shear thinning, i.e., high apparent viscosities at low shear and much lower viscosity at high shear. However, upon curing (e.g., with a peroxide agent as with Examples 3 and 4, or with UV curing as in Examples 5 and 6), the gel composition became solid material. Similarly, the oil gel compositions shown in Table 5 made using Polymer 2 also resulted in sold upon curing.

The terms "a," "an," and "the" are intended, unless specifically indicated otherwise, to include plural alternatives, e.g., at least one. Herein, while compositions and processes are described in terms of "comprising" various components or steps, the compositions and methods can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

While various aspects of the present disclosures have been shown and described, modifications thereof can be made by one skilled in the art without departing from the spirit and teachings of the invention. The aspects of the present disclosures described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspect of the present disclosures of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

What is claimed is:

1. A gel composition comprising: (i) a styrenic block copolymer, (ii) an oil; and (iii) optional additives:
    wherein the styrenic block copolymer has a structure ABi or iAB, where
      A is a monoalkenyl arene block,
      B is a conjugated diene block,
      i is an isoprene attachment,
      the isoprene attachment i is substantially unsaturated and B is substantially saturated,
      the monoalkenyl arene block has a molecular weight ranging from 35 kg/mol to 100 kg/mol;
    wherein
      the gel composition before curing is not solid, with a viscosity ranging from about 5000 mPa·s to about 30000 mPa·s. at 25° C. and a shear rate of 20 s$^{-1}$; and
      the gel composition after curing is solid.

2. The gel composition of claim 1, wherein the styrenic block copolymer has a structure of ABi or iAB, and wherein the isoprene attachment i has a hydrogenation level of <50% and the conjugated diene B block has a hydrogenation level of >90%.

3. The gel composition of claim 2, wherein the isoprene attachment i has a hydrogenation level of <40% and the conjugated diene B block has a hydrogenation level of >95%.

4. The gel composition of claim 3, wherein the isoprene attachment i has a hydrogenation level of <35% and the conjugated diene B block has a hydrogenation level of >98%.

5. The gel composition of claim 1, wherein at least 75% of double bonds present in the conjugated diene B block are hydrogenated.

6. The gel composition of claim 1, wherein from about 20% to about 60% of the double bonds in the isoprene attachment i are hydrogenated.

7. The gel composition of claim 1, wherein a difference in the hydrogenation level of the conjugated diene B block and the hydrogenation level of the isoprene attachment i is greater than about 20%.

8. The gel composition of claim 1, wherein the styrenic block copolymer has a total residual unsaturation of from about 0.2 milliequivalents/gram to about 4 milliequivalents/gram.

9. The gel composition of claim 1, wherein the monoalkenyl arene A block comprises styrene, alpha-methylstyrene, para-methylstyrene, vinyl toluene, vinylnaphthalene, diphenyl ethylene, para-butyl styrene, or mixtures thereof.

10. The gel composition of claim 1, wherein the monoalkenyl arene A block has a polystyrene content of from about 15% to about 40%.

11. The gel composition of claim 1, wherein the monoalkenyl arene A block has an apparent molecular weight of at least 40 kg/mol.

12. The gel composition of claim 1, wherein the conjugated diene B block comprises conjugated 1,3-butadiene or conjugated substituted butadienes.

13. The gel composition of claim 1, wherein the conjugated diene block B has an apparent molecular weight of from about 30 kg/mol to about 150 kg/mol.

14. The gel composition of claim 1, wherein the isoprene attachment i has an apparent molecular weight of from about 2 kg/mol to about 15 kg/mol.

15. The gel composition of claim 1, wherein the styrenic block copolymer further comprises less than 5 wt. % of a styrenic triblock copolymer based on the total weight of the styrenic block copolymer.

16. The gel composition of claim 1, wherein the styrenic block copolymer is present in an amount of from about 1 wt. % to about 30 wt. % based on the total weight of the composition.

17. The gel composition of claim 1, wherein the oil is present in an amount of from about 70 wt. % to about 99 wt. % based on the total weight of the composition, and wherein the oil comprises a paraffin, a mineral oil, a gas-to-liquid oil, a synthetic oil, or combinations thereof.

18. The gel composition of claim 1, wherein the optional additives comprise an antioxidant, a metal deactivator, a curing accelerator, a rheology modifier, or combinations thereof.

19. The gel composition of claim 1, wherein the gel composition is cured by any of UV irradiation, thermal treatment, or both, to form a solid gel after curing.

20. The gel composition of claim 12, wherein the conjugated substituted butadiene is piperylene, 2,3-dimethyl-1,3-butadiene, 1-phenyl-1,3-butadiene or mixtures thereof.

* * * * *